Sept. 11, 1934.　　　　J. P. TARBOX　　　　1,973,183
METHOD OF MAKING METAL SPOKED WHEELS
Filed June 14, 1930
FIG.1
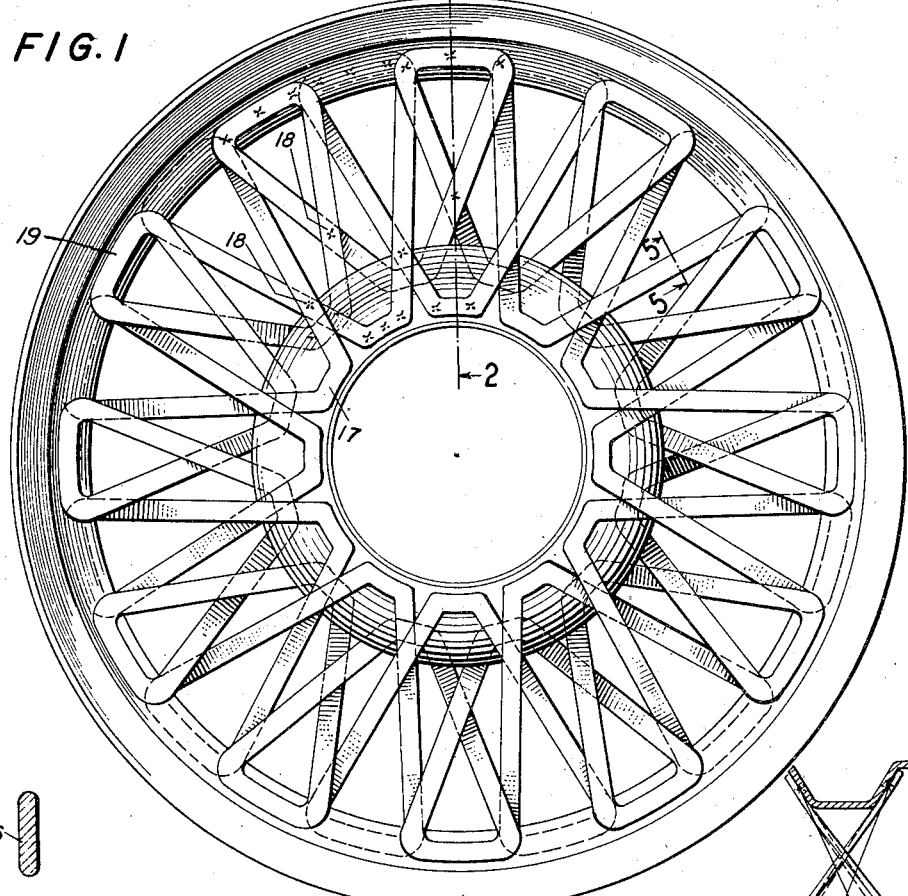
FIG 5
FIG.3
FIG.4
FIG.2
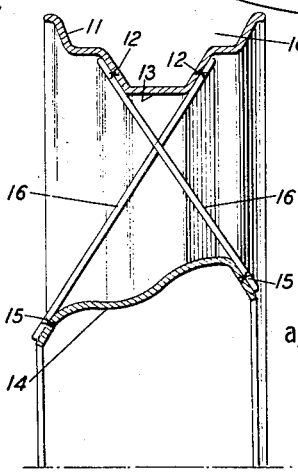
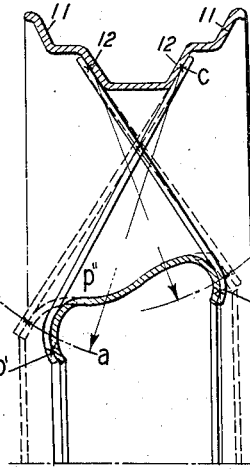
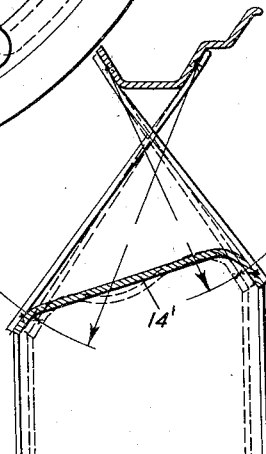
INVENTOR.
J. P. Tarbox Patented Sept. 11, 1934

1,973,183

UNITED STATES PATENT OFFICE 1,973,183

METHOD OF MAKING METAL SPOKED WHEELS

John P. Tarbox, Philadelphia, Pa., assignor to Budd Wheel Company, Philadelphia, Pa., a corporation of Pennsylvania Application June 14, 1930, Serial No. 461,145

9 Claims. (Cl. 29—159.02)

My invention relates to the art of spoked wheels and is especially adapted for use on light vehicles, although it also has adaptation for use on heavy duty automobiles. The primary object is the production of a cheap and economical wire wheel having the requisite mechanical characteristics for the duty for which it is designed, as for example, strength, durability and quality.

An important feature of my invention consists in the form winding of flat spoke bodies in continuous annularly extended series, and thereafter interconnecting the rim and hub by such series.

Other important aspects of my invention relate to improved means for tensioning the wheel body between the hub and rim.

Other objects of my invention will be obvious from the reading of the attached specification in the light of the drawing in which, Fig. 1 is a view in side elevation of a wheel constructed according to my invention.

Fig. 2 is a sectional view on the line 2—2 of Fig. 1 illustrating the wheel before the final tensioning step is performed.

Fig. 3 is a sectional view similar to Figure 2 illustrating the final tensioning step.

Fig. 4 is a view similar to Figures 2 and 3 illustrating an alternative method of tensioning the wheel and the wheel produced thereby.

Fig. 5 is a sectional view on the line 5—5 of Fig. 1.

The rim of my improved wheel is indicated at 10 and in the form shown, a drop center rim is illustrated, although my invention is not necessarily limited to the use of such a rim. This rim is provided with side flanges 11 drop center conically surfaced side flange portions 12 and a base portion 13. The hub is illustrated at 14 and is provided with a pair of substantially radially extended flanges 15. In the initial stages of the assembly, these flanges lie in line with the respective drop center flange portions of the rim and are substantially in continuation of the extended conical surfaces thereof. The spokes are indicated at 16 and are preferably formed in two annularly connected series by edge-winding flat strip stock in the desired form upon a wire winding machine of known design.

Each of these annuli comprises a continuous strip formed into the desired contour. I prefer to provide substantially circumferentially extending concave portions in these spoke bodies adjacent the hub and rim. The spokes proper form an angle of substantially 120° with respect to the circumferential hub portions and 60° with respect to the circumferential rim portions. The successive spokes of a given series thus cross each other at intermediate points and are preferably welded at these points as indicated at 18. I have found this type of winding preferable because of the increased welding surface which it affords in the radial extremities of the spokes, as indicated at 19. This type of spoke body also may be very easily assembled with the wheel and interlaced with its companion spoke body. I thus obtain a rigid spoke body which may be conveniently welded to the hub and rim, and of which the respective spokes may be welded to each other, and in which the angular relationship of the spokes inter se is conducive to a pleasing appearance and a strong wheel. A pair of spoke bodies is thus obtained conforming to the desired configuration of the two sets of spokes destined to connect the hub and rim. The several spokes of each set are connected to each other at their inner and outer extremities as indicated at 17 and 19 of Fig. 1 of the drawing. These spokes are inter-laced and arranged with their extremities abutting the hub flanges and the side walls of the drop center portion of the rim respectively. The assembly operation may be performed in a suitable assembly and/or welding jig and the spokes are spot welded to the hub and rim members against which they abut adjacent their extremities after the assembly operation.

According to the tensioning method disclosed in Fig. 3, the side flanges of the hub are bent inwardly by means of any suitable mechanism after the spokes are assembled with and welded to the hub and rim as above described. As this bending operation causes the welded joints of the spokes and hub flanges to swing through an arc or series of arcs having centers within the body of the hub at a point or points axially displaced toward the center line of the wheel from the welded portions, the spoke will be elongated and thereby the wheel tensioned.

A few geometrical considerations will readily demonstrate the fact that this elongation takes place. Referring to Fig. 3, the length of a spoke between its spot welded portions before the bending operation is the distance between the points $c$ and $p$. As we swing an arc $aa$ about the point $c$ with $cp$ as a radius, every point in this arc will of course, be equidistant from the point $c$. In bending the hub and spoke inwardly about a point such as $p''$, however, the point $p$ describes an arc about this point $p''$. In this movement it is obvious that the point $p$ will be bent into a position below the arc aa. It is thus obvious that the distance cp' which represents the effective length of the spoke after the bending of the hub is greater than the distance cp which represents its effective length before this bending takes place. These spokes thus undergo an elongation as a result of the bending step and are consequently tensioned thereby. The portion cp' has a length even more in excess of the distance cp, than the above consideration would indicate as the spoke is forced to follow a curved line in its portion which contacts the hub flanges, as distinguished from its original straight line contact.

According to the modification of Fig. 4, the hub 14' is formed with a curved main body portion and this portion is straightened after the welding operation to separate portions of the two sets of spokes which are welded to the hub to tension the wheel.

While I have described two methods of tensioning my improved wheel, I do not wish to be limited to any specific method of tensioning, as any other known methods of tensioning may be embodied in this connection. The spokes might, for example, be heated before they are welded in place, in which case, the normal contraction of the spokes upon cooling would effect a tensioning of the wheel. Spoke series might also be welded in position successively in different welding jigs, the last welding jig having hub and rim seats relatively offset in such a manner as to place an excessive tension on the first set of spokes during the welding of the second. In this last mentioned case, the normal spring back of the excessively tensioned set of spokes acts upon the release of the wheel from the jigs to tension the first set of spokes, thereby equalizing the tension on the two sets of spokes.

It will be obvious that I have produced a wheel of economical structure and superior strength and a wheel which has a pleasing appearance.

As modifications will be obvious to those skilled in the art, I do not wish to be limited except by the generic spirit of my invention as interpreted in the light of the prior art and my sub-joined claims.

I claim:

1. The method of making a spoked wheel which comprises forming rim and hub elements with front and rear wheel plane surfaces and securing continuous flat strip spokes severally in side-surface engagement with one wheel plane surface of the rim and the opposite wheel plane surface of the hub.

2. The method of forming a spoked wheel which comprises bending elongated flat stock into return-bent spaced loops continuing annularly about a wheel axis, placing sections of said stock thus bent in intersecting planes with the loops of one section between the loops of another section, and welding said stock in the alternate bend portions to the rim and hub members.

3. The method of forming a spoked wheel which comprises bending elongated flat stock into return-bent spaced loops continuing annularly about a wheel axis, placing sections of said stock thus bent in intersecting planes with the loops of one section between the loops of another section, and welding said stock in the alternate bend portions to the rim and hub members and radially bending the axial extremities of said hub member, whereby to tension said spokes.

4. The method of making a spoked wheel which comprises bending elongated flat sheet stock in continuing relation about a wheel axis to form a plurality of spoke portions with interconnecting bend portions between said spoke portions, and welding said stock in side surface engagement through the alternate bend portions of said stock to rim and hub members and at the opposite axial sides of said rim and hub members, arranging a second continuous elongated flat sheet stock whereby to provide intersecting spoke body planes intermediate said hub and rim members and welding said second stock member in the alternate bend portions thereof to the opposite axial extremities of said rim and hub members.

5. The method of making a spoked wheel which comprises bending elongated flat sheet stock in continuing relation about a wheel axis to form a plurality of spoke portions with interconnecting bend portions between said spoke portions, and welding said stock in side surface engagement through the alternate bend portions of said stock to rim and hub members and at the opposite axial sides of said rim and hub members, arranging a second continuous elongated flat sheet stock whereby to provide intersecting spoke body planes intermediate said hub and rim members and welding said second stock member in the alternate bend portions thereof to the opposite axial extremities of said rim and hub members intermediate the bend portions of said first stock member.

6. The method of making a spoked wheel which comprises bending elongated flat sheet stock in continuing relation about a wheel axis to form a plurality of spoke portions with interconnecting bend portions between said spoke portions, and welding said stock in side surface engagement through the alternate bend portions of said stock to rim and hub members and at the opposite axial sides of said rim and hub members, arranging a second continuous elongated flat sheet stock whereby to provide intersecting spoke body planes intermediate said hub and rim members and welding said second stock member in the alternate bend portions thereof to the opposite axial extremities of said rim and hub members, and tensioning said spoke bodies by an inward radial bending of the axial extremities of said hub member.

7. The method of making a spoked wheel which comprises bending elongated flat sheet stock in continuing relation about a wheel axis to form a plurality of spoke portions with interconnecting bend portions between said spoke portions, and welding said stock in side surface engagement through the alternate bend portions of said stock to rim and hub members and at the opposite axial sides of said rim and hub members, arranging a second continuous elongated flat sheet stock whereby to provide intersecting spoke body planes intermediate said hub and rim members and welding said second stock member in the alternate bend portions thereof to the opposite axial extremities of said rim and hub members intermediate the bend portions of said first stock member, and tensioning said spoke bodies by an inward radial bending of the axial extremities of said hub member.

8. The method of making a spoked wheel which comprises bending two elongated flat strip stock members in continuing relation about a wheel axis to form a plurality of spoke portions, and interconnecting bend portions therebetween, arranging said members whereby to provide flat surface contacting areas by said bend portions at opposite axial extremities of said hub and rim members for each of said flat stock members, heating said spoke body portions, securing said flat stock members in the bend portions to said rim and hub members and cooling said spoke body portions whereby to tension said wheel body.

9. The method of making a spoked wheel, which comprises forming continuous strip flat sheet spoke bodies, arranging said bodies in intersecting planes between the hub and the rim, and securing the bodies in flat side engagement with rim and hub members at the strip bends between the spokes.

JOHN P. TARBOX.